United States Patent Office 2,852,856
Patented Sept. 23, 1958

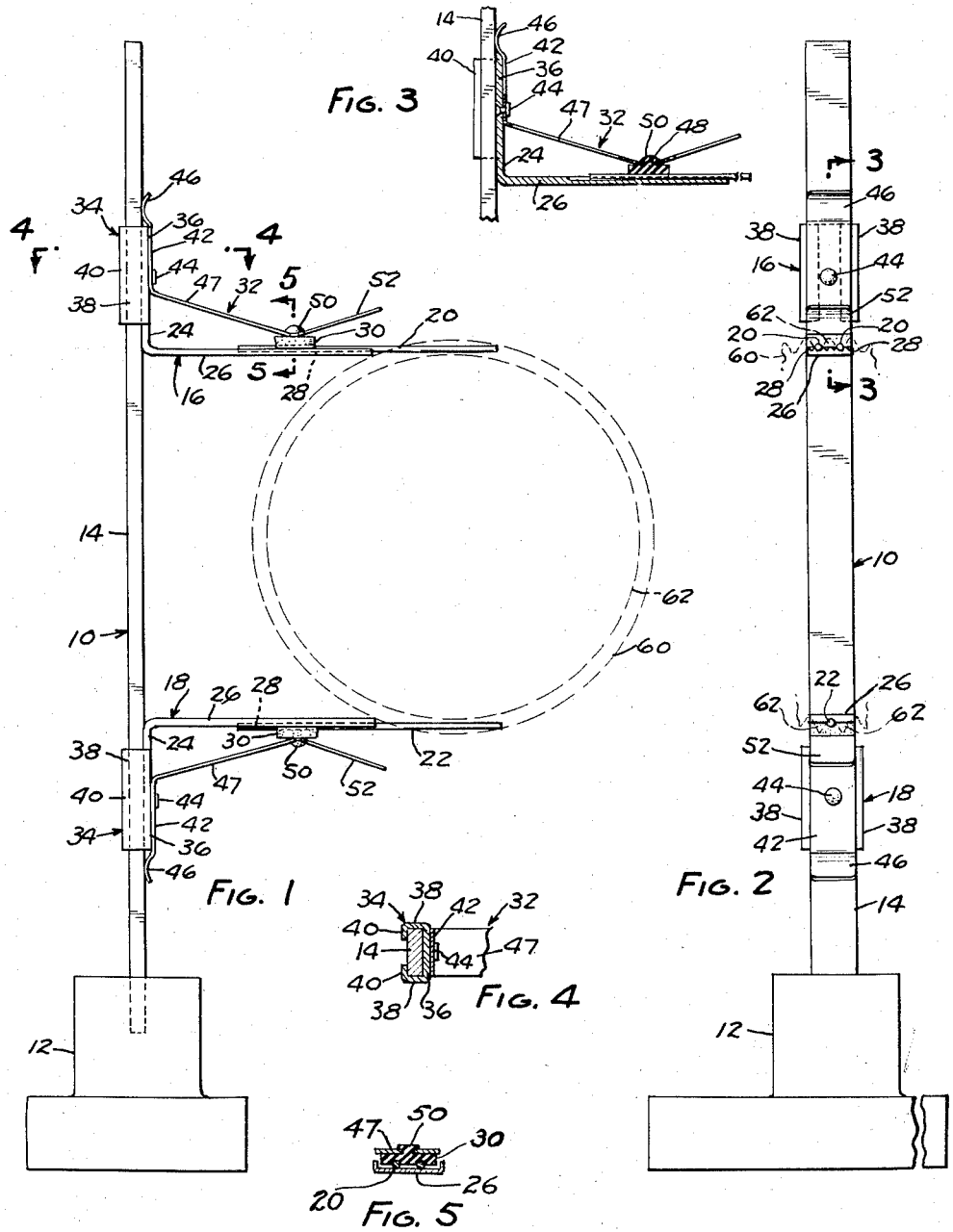

2,852,856

EXTERNAL THREAD PITCH MEASURING DEVICE

Barry S. Cox, Royal Oak, Mich.

Application October 7, 1957, Serial No. 688,568

4 Claims. (Cl. 33—199)

This invention pertains to an external thread pitch measuring device and more particularly to such a device in which gauge wires are secured in a manner permitting full and accurate "feel" by micrometers of the precise gauge diameter of the threads.

Gauge wires used for checking external threads are used in sets of three, two of the wires being disposed in adjoining thread V's on one side of the threaded work piece, the third wire being disposed in a V diametrically opposite and parallel to the first two wires. The checker brings his micrometers into place over the wires. He must make a proper "bearing feel" to the wires for accurate and precise measurement. Because five elements— the three wires, micrometer and threaded work piece— must be manipulated in two hands, it is quite a difficult operation to perform accurately.

Although thread gauge wires have been supported in various manners and constructions heretofore, it has been found that, unless the wires were precisely and accurately held about, upon and in the thread V's, the micrometer "feel" was such that inaccurate measurements were taken. To hold the wires rigidly fixed in a support to precise disposition on the threads is in itself a matter of great accuracy and setup. Little tolerance is permissible in such constructions, so that considerable time would be expended getting the gauge wires accurately aligned prior to micrometer measurement.

The instant invention provides a mounting construction for the gauge wires in which they are secured at their inboard ends, upon a support that has a flat rest surface or which is V-serrated, by a resilient pad, preferably of rubber, applied against them by spring pressure. The support is slidably mounted upon a vertically held slide bar, so that the gauge wires project outwardly to be brought to rest in the thread V's accurately, precisely and with ease. As the micrometer anvil and pin come into bearing contact with the gauge wires, the latter readily yield into parallel alignment to provide the operator with the proper "bearing feel" so that he can make an accurate and precise measurement of the gauge diameter.

It is therefore an object of the invention to provide a thread pitch measuring device in which gauge wire sets are secured in mounts permitting flexure and alignment of the wires with ease. Another object is to provide a measuring device in which the gauge wires are mounted in firm supports and secured thereto by resilient means such that flexure of the gauge wires does not interfere with the "bearing feel" of micrometers checking the diametric measurement across the wires. A further object is the provision of a supported slide bar upon which tension held gauge wire supports are slidably mounted for bringing the same easily and quickly into spaced contact with the threaded part to be gauge checked.

These and additional objects of the invention and features of construction will become more readily apparent from the description given below, in which the terms are used for purposes of description and not of limitation.

Reference is made to the drawing annexed hereto, forming an integral part of this specification, and in which Fig. 1 is a side elevational view of the inventive thread pitch measuring device.

Fig. 2 is a front elevational view of the device of Fig. 1.

Fig. 3 is a vertical sectional view, partly in elevation, taken substantially on the line 3—3 of Fig. 2.

Fig. 4 is a horizontal sectional view, partly in elevation, taken substantially on the line 4—4 of Fig. 1.

Fig. 5 is a vertical sectional view on the line 5—5 of Fig. 1.

As shown in the several views of the drawing, the thread pitch measuring device 10 comprises a base 12, a vertically supported slide bar 14 mounted on the base, a pair of opposedly mounted wire holders 16 and 18, slidingly mounted on the bar 14, a pair of upper gauge wires 20, 20 and a single lower gauge wire 22.

The upper wire holder 16 and the lower wire holder 18 are substantially identical, and it is deemed sufficient to describe only one of them in detail, it being understood that in respect to their common features of construction the two wire holders are identical.

The upper wire holder 16 comprises a gauge wire support 24 having an extension arm 26 on which the gauge wires 20, 20 are positioned in the V-cut serrations 28 on the upper surface of the arm at its outboard end, and a resilient pad 30 mounted on the duplex spring clip 32. The arm 26 may also be perfectly flat, i. e. without serrations 28. The wire support 24 is also provided with a channel portion 34, seen more clearly in Fig. 4, having a web 36, side walls 38 and inturned flanges 40, the channel 34 being adapted to closely encompass the slide bar 14 for frictional sliding action thereon.

The spring clip 32 is provided with an element 42 conjoined to the channel web 36 by a rivet 44, or in any other suitable manner, the element 42 terminating at one end in a spring tension applying tail element 46 bearing on the slide bar 14. A second element 47 of the clip 32 extends over the wire support arm 26 and is provided with an opening 48 adapted to pass the attaching button or lug 50 on resilient pad 30, so as to secure the pad to the underside of the element 47. The clip element 47 is bent upwardly at the opening 48, terminating in the element 52 which projects upwardly and away from the gauge wires 20, 20 seated in the serrations 28. The terminal element 52 also serves as a handle to be lifted, whereby the resilient pad 32 may be removed from its pressure position upon the gauge wires to release them directly from the support 24.

A distinction between the gauge wire holder 16 and the holder 18 lies in the location of the serrations 28 in the latter. These are positioned such that the single gauge wire 22 lies aligned centrally between the gauge wires 20, 20 in the upper holder. The arm 26 of holder 18 may also be flat and planar, i. e. without serrations.

As an example, the threaded part 60 to be checked is provided with thread V's 62.

In operation, the thread pitch measuring device 10 is usually arranged so that its base 12 rests on a checking table or bench. The lower gauge wire holder 18 is positioned on the slide bar 14 so that when the threaded part 60 is placed on its gauge wire 22, the upper wire holder 16 can be slid down bar 14 bringing the upper gauge wires 20, 20 into bearing contact in the thread V's 62.

Both wire holders 16 and 18 are held in frictional sliding support on bar 14 by the spring clip tail elements 46 of the holders, so that the operator is only obliged to hold the threaded part 60 in one hand while bringing the micrometer pin and anvil into bearing contact upon the gauge wires with the other hand.

The resilient pad 30 permits the gauge wires 20, 20 and 22 to be brought into the V's 62 of the threaded part without the precision adjustment heretofore required where the gauge wires have been fixedly held in supports of one kind or another. The pad 30 permits the operator to bring the micrometer into bearing contact over the gauge wires, and for the wires to take their normal tangent position to the screw threads while the micrometer adjustment is being made. Because the wires are supported and relatively free to adjust themselves tangentially in the thread V's, the normal "feel" or "bearing" of the micrometer measurement is not changed for the operator.

The results obtained in the use of device 10 include easier and quicker set up for thread pitch diameter measurement, less operator fatigue because of the want of precise setups, and more accurate, precise measurements.

The base 12 may be weighted or arranged as a magnetic base. The device 10 with base may be positioned on the cross slide of a machine lathe or other tool, so that the gauge wires 20, 20 and 22 may be fed directly into the threaded part mounted in the lathe. The threaded part 60 can then be held and positioned to the gauge wires with one hand while the other hand adjusts the micrometer for measurement.

The parts hereabove described are preferably made of metal, except the resilient pad 30 which is preferably made of rubber.

Having described the invention in its simplest terms, it is to be understood that the features of construction may be changed and varied in greater or lesser degree without departing from the essence of the invention.

I claim:

1. In a gauge device for determining the pitch diameter of an externally threaded member by means of a micrometric measuring device, a support having a slide bar mounted thereon, a pair of opposed aligned parallel gauge wire holders slidable on said bar, one of said holders supporting a pair of gauge wires, the other of said holders supporting a single gauge wire in aligned relationship to said pair of gauge wires, each of said wire holders having a channel portion slidable on said bar and terminating in an extension arm supporting said gauge wires thereon normal to said bar, spring tension means mounted on said channel portion having an element in frictional sliding contact with said bar for holding said wire holder in position on said bar and a second element extending over and in pressure applying relationship to said gauge wires on said arm, and resilient means mounted on said second element in bearing contact upon said gauge wires, said wire holders being positionable on each side of said threaded member, whereby when said gauge wires are brought into position in the V's of said threaded member said gauge wires assume a tangential position thereto as said measuring device is adjusted to measurement.

2. A supported gauge for use in determining the pitch diameter of an externally threaded member by means of a micrometric measuring device comprising a support, a slide bar on said support, a pair of opposed aligned parallel gauge wire holders slidable on said bar, one of said holders supporting a pair of gauge wires, the other of said holders supporting a single gauge wire in aligned relationship to said pair of gauge wires, each of said wire holders having a channel portion slidable on said bar and terminating in an extension arm projecting normal to said bar, said arm being provided with longitudinally extending parallel serrations on one side thereof to seat said gauge wires, spring tension means mounted on said channel portion having an element in frictional sliding contact with said bar for positioning said wire holder on said bar and a second element extending over and in pressure applying relationship to said gauge wires on said arm, and a resilient pad mounted on said second member in bearing contact upon said gauge wires, said wire holders being positionable on each side of said threaded member, whereby when said gauge wires are brought into position in the V's of said threaded member said gauge wires may easily yield into a tangential position thereto as said measuring device is adjusted to measurement.

3. A supported gauge for use in determining the pitch diameter of an externally threaded member with a micrometric measuring device comprising a support, a slide bar mounted on said support, thread gauge wires of a size for checking the pitch diameter of said threaded member, a pair of opposed aligned parallel gauge wire holders slidable on said bar and adapted to be frictionally positioned thereon, each of said wire holders comprising a portion encompassing said bar and terminating in an extension arm projecting normal to said bar, a spring clip mounted on said holder having one member in frictional sliding contact with said bar and a second member extending over and in pressure applying position with respect to said gauge wires on said arm, and a resilient pad mounted on said second member in bearing contact upon said gauge wires, one of said gauge wire holders being positionable on each side of said threaded member, whereby when said gauge wires are brought into position in the V's of said threaded member said gauge wires may easily take a tangential position thereto as said measuring device is adjusted to measurement.

4. A supported gauge for use in determining the pitch diameter of an externally threaded screw member with a micrometric measuring device comprising a slide bar, thread gauge wires of a size for checking the pitch diameter of said screw member, a pair of opposed aligned parallel gauge wire holders adapted to slide on said bar and to be frictionally held in position thereon, each of said wire holders comprising a channel portion encompassing said slide bar and terminating in an extension arm projecting from said channel normal to said bar, said arm having a flat planar surface on one side thereof at its terminal end adapted to seat said gauge wires, means mounted on said channel portion to frictionally hold the same in position on said slide bar and terminating in an element extending over and adapted to bear upon said arm, and a resilient pad supported on said element on the underside thereof in bearing contact upon said gauge wires, one of said gauge wire holders being positioned on each side of said threaded screw member, whereby when said gauge wires are brought into position in the V's of said threaded screw member said wires may easily take a tangential position thereto as said measuring device is adjusted to measurement.

No references cited.